(12) United States Patent
Schmitt

(10) Patent No.: US 7,380,567 B2
(45) Date of Patent: Jun. 3, 2008

(54) SAFETY VALVE ASSEMBLY HAVING RESET MECHANISM

(75) Inventor: Craig Schmitt, Phoenix, AZ (US)

(73) Assignee: Watts Sea Tech, Inc., North Andover, MA (US)

( * ) Notice: Subject to any disclaimer, the term of this patent is extended or adjusted under 35 U.S.C. 154(b) by 169 days.

(21) Appl. No.: 11/215,781

(22) Filed: Aug. 30, 2005

(65) Prior Publication Data

US 2006/0054218 A1    Mar. 16, 2006

Related U.S. Application Data

(60) Provisional application No. 60/605,572, filed on Aug. 30, 2004, now abandoned.

(51) Int. Cl.
*F16K 17/30* (2006.01)
(52) U.S. Cl. .................................... 137/460
(58) Field of Classification Search ............... 137/460, 137/458, 504, 460 I, 504 X
See application file for complete search history.

(56) References Cited

U.S. PATENT DOCUMENTS

| | | | | |
|---|---|---|---|---|
| 2,149,673 A | * | 3/1939 | Godfrey | ............... 137/504 |
| 2,586,691 A | * | 2/1952 | Mills et al. | ............ 137/495 |
| 3,244,194 A | * | 4/1966 | Henry | ............... 137/460 |
| 3,735,777 A | | 5/1973 | Katzer et al. | |
| 4,117,860 A | * | 10/1978 | Carlin | ............. 137/513.5 |
| 4,250,915 A | | 2/1981 | Rikuta | |
| 4,625,757 A | * | 12/1986 | Dykstra | ............. 137/504 |
| 5,103,857 A | | 4/1992 | Kuhn et al. | |
| 5,215,178 A | | 6/1993 | Bartlett | |
| 5,294,093 A | | 3/1994 | Huveteau et al. | |
| 2004/0221893 A1 | | 11/2004 | Johnson | |

FOREIGN PATENT DOCUMENTS

| | | |
|---|---|---|
| CN | 2203388 | 7/1995 |
| CN | 2725664 | 9/2005 |

\* cited by examiner

*Primary Examiner*—Stephen M Hepperle
(74) *Attorney, Agent, or Firm*—Fish & Richardson P.C.

(57) ABSTRACT

A valve assembly includes an excess flow shut-off mechanism for controlling flow between an inlet and an outlet of the assembly. The excess flow shut-off mechanism is adapted to automatically stop fluid flow through the valve assembly when the flow exceeds a specified flow rate. The excess flow shut-off mechanism prevents flow when it's set and allows flow when it's reset. The valve assembly also includes a reset mechanism for setting and resetting the excess flow shut-off mechanism independently of the flow rate.

13 Claims, 11 Drawing Sheets

SAFETY VALVE ASSEMBLY HAVING RESET MECHANISM

CROSS-REFERENCE TO RELATED APPLICATION

The present application claims priority from provisional U.S. Patent Application Ser. No. 60/605,572, filed Aug. 30, 2004, now abandoned which is incorporated herein by reference in its entirety.

TECHNICAL FIELD OF THE DISCLOSURE

This disclosure relates to valve assemblies and, more particularly, to a safety valve assembly having a reset mechanism.

BACKGROUND OF THE DISCLOSURE

Safety valve assemblies are used to prevent uncontrolled fluid flow resulting from a break in a conduit, such as a flexible conduit connecting a filter system to faucet or a water source. U.S. Pat. No. 3,735,777 discloses an automatic shut-off valve for use with household appliances to prevent the release of water due to a hose connection becoming loose or breaking. The need to prevent uncontrolled excess flow has also been recognized in applications other than water systems. U.S. Pat. No. 5,215,178, for example, discloses a rapid acting safety valve for preventing leakages resulting from failure of a pressurized hydraulic line. In both cases, the valves allow normal flow but automatically close to terminate flow when the flow through the valve becomes excessive, as would occur upon the failure of a hose connection. If excess flow occurs, a valve flapper or piston moves against the force of a spring to close against a valve seat.

A rapid acting shutoff such as disclosed in U.S. Pat. No. 5,215,178 would be subject to premature nuisance shutoff if used to supply a flexible connector in a household water system. In a water system, air can be present in the piping system. A flow surge can occur when air flows through a faucet or toilet fill valve supplied from a flexible connector. A rapid acting shutoff could close in response to such a surge, disabling the supplied appliance until the shutoff condition is corrected by reopening the shutoff device. The valve disclosed in U.S. Pat. No. 3,735,777 includes a damping mechanism to prevent premature nuisance shutoff. In either case, however, the valves must be disconnected to relieve pressure in order to be reset after the failure of a flexible connector.

What is still desired is a new and improved safety valve assembly. Among other advantages and benefits, the new and improved safety valve assembly will preferably include a reset mechanism that allows manual opening ("resetting") and closing ("setting") of the valve. Manual operation of the safety valve assembly, for example, beneficially allows the valve assembly to be reset without being first being disconnected from a fluid conduit. Manual operation also allows the safety valve assembly to be held open during excess flow and to be closed if desired even when there is no excess flow.

SUMMARY OF THE DISCLOSURE

The present disclosure provides a new and improved safety valve assembly including an excess flow shut-off mechanism for controlling flow between an inlet and an outlet of the assembly. The excess flow shut-off mechanism is adapted to automatically stop fluid flow through the valve assembly when the flow exceeds a specified flow rate. The excess flow shut-off mechanism prevents flow when it's set and allows flow when it's reset. The valve assembly also includes a reset mechanism for setting and resetting the excess flow shut-off mechanism independently of the flow rate.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Figure 1:
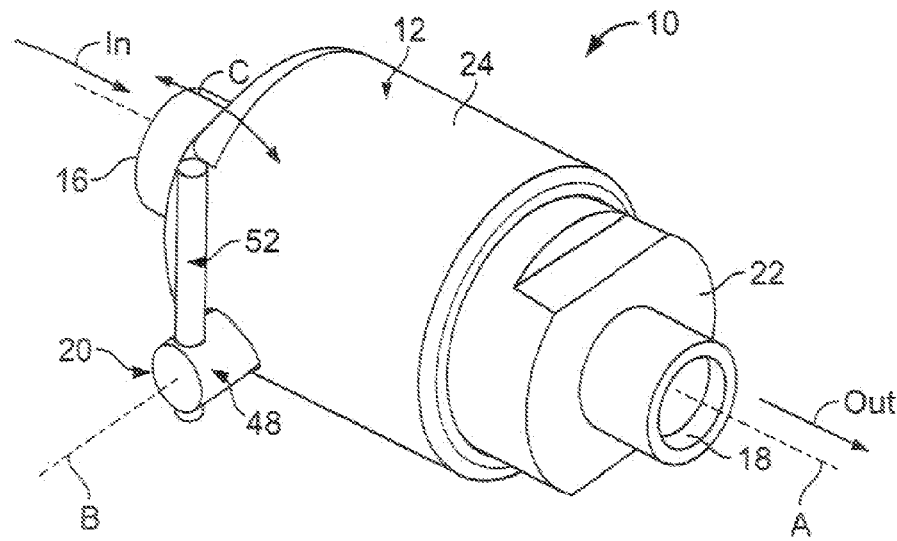
FIG. 1 is a perspective view of an exemplary embodiment of a safety valve assembly constructed in accordance with the present disclosure.
Figure 2:
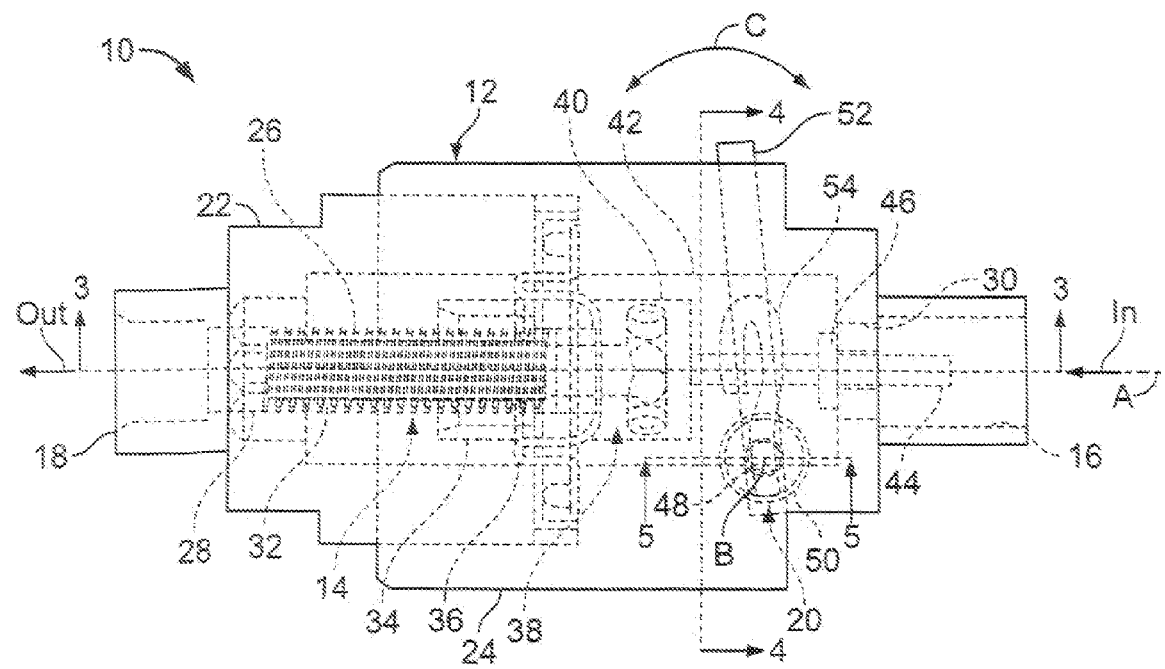
FIG. 2 is a side elevation view of the valve assembly of FIG. 1.

Referring to FIGS. 1 and 2, a safety valve assembly 10 includes a housing 12 and an excess flow shut-off mechanism 14 contained within the housing for controlling flow between an inlet 16 and an outlet 18 of the housing. The housing 12 includes a central longitudinal axis "A" extending between the inlet 16 and the outlet 18. The excess flow shut-off mechanism 14 is adapted to automatically stop fluid flow through the valve housing 12 when the flow exceeds a specified flow rate. This feature is desirable in household appliances, for example, to prevent water damage due to leaks or broken water conduits. In one particular example, the safety valve assembly 10 is used in a water filtration system. The excess flow shut-off mechanism 14 prevents flow when it's set and allows flow when it's reset.

The valve assembly 10 further includes a reset mechanism 20 for setting and resetting the excess flow shut-off mechanism 14. The valve assembly 10 can be reset (e.g., opened) and set (e.g., closed) by using the reset mechanism 20. The valve assembly 10 can also be held open or held closed using the reset mechanism 20. This feature is desirable when installing or testing a water filtration system, for example.

Figure 3:
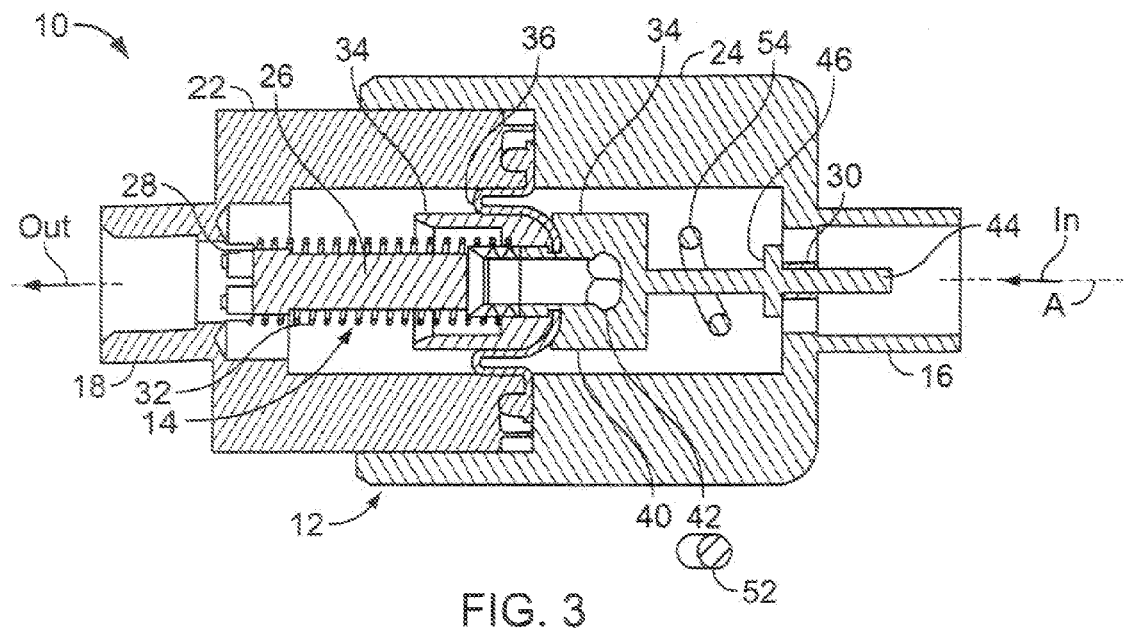
FIG. 3 a sectional view of the valve assembly taken along line 3-3 of FIG. 1.
Figure 4:
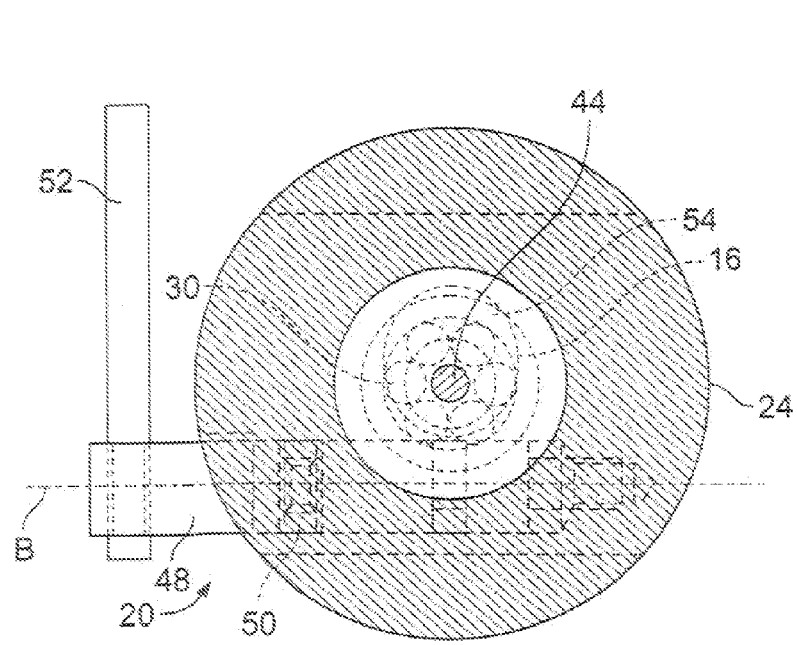
FIG. 4 a sectional view of the valve assembly taken along line 4-4 of FIG. 1.
Figure 5:
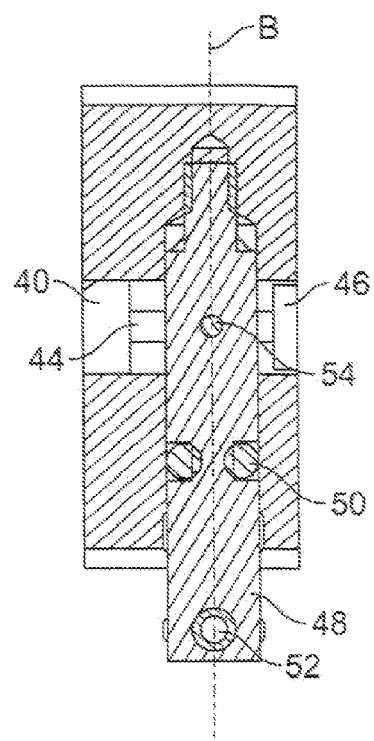
FIG. 5 a sectional view of the valve assembly taken along line 5-5 of FIG. 1.

As shown best in FIG. 3, the valve assembly 10 includes an exit housing 22 defining the outlet 18 and an inlet housing 24 defining the inlet 16. The exit housing 22 includes a valve seat 26 and a grate 28 provided between the valve seat 26 and the outlet 18, while the inlet housing 24 includes a grate 30 at the inlet 16.

Figure 6:
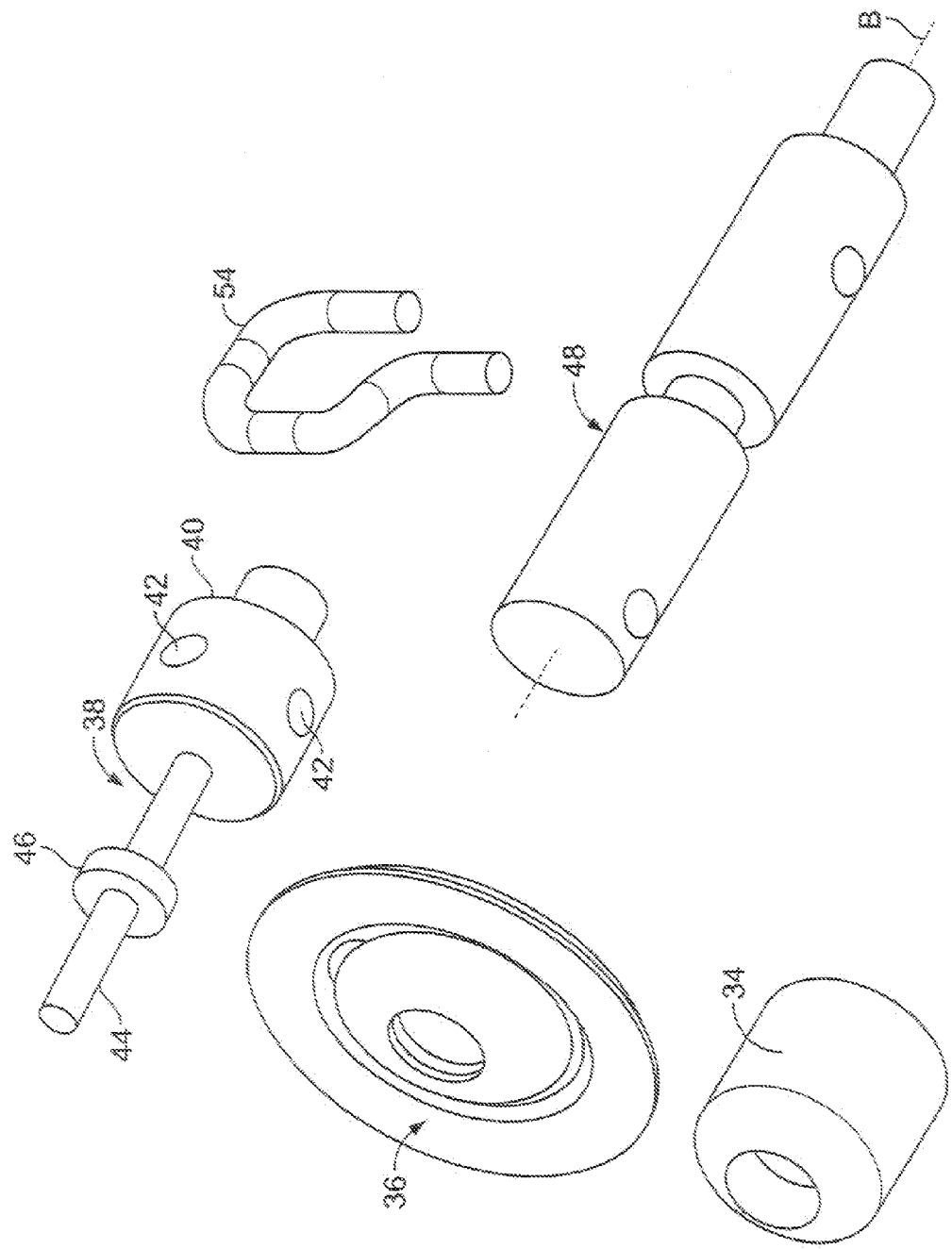
FIG. 6 are perspective views of some disassembled parts of the valve assembly of FIG. 1.
Figure 7:
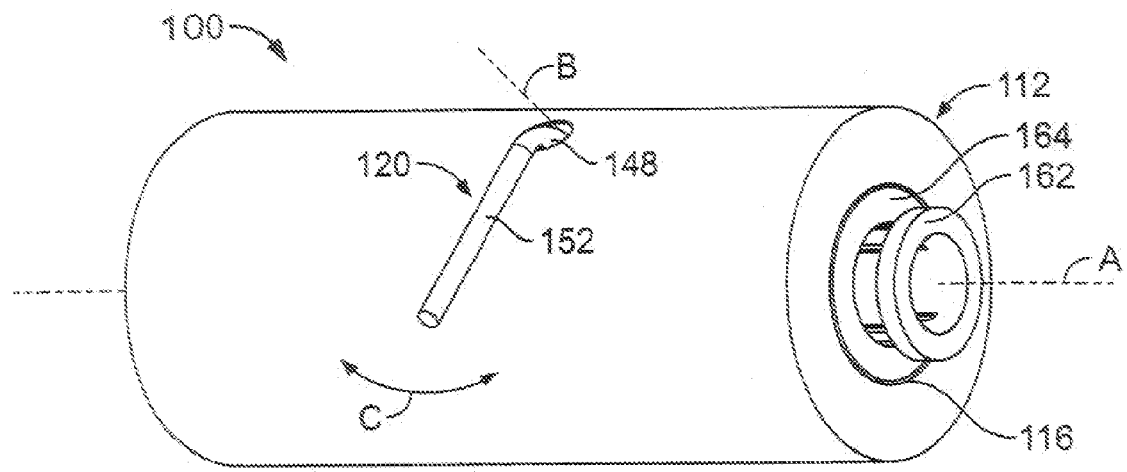
FIG. 7 is a perspective view of another exemplary embodiment of a safety valve assembly constructed in accordance with the present disclosure.
Figure 8:
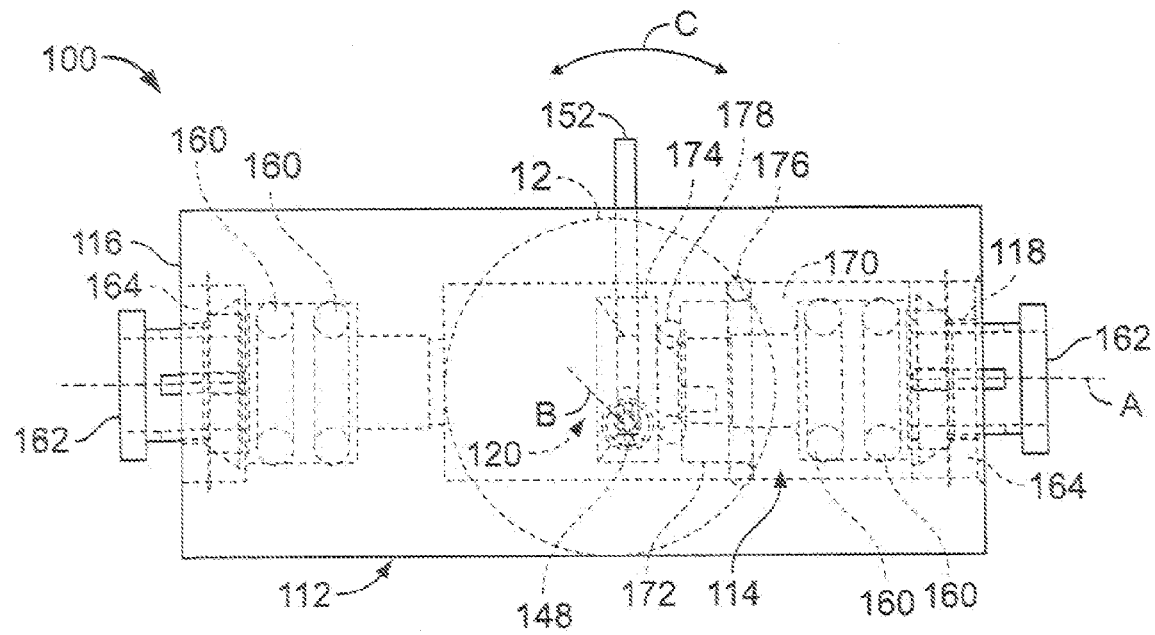
FIG. 8 is a side elevation view of the valve assembly of FIG. 7.
Figure 9:
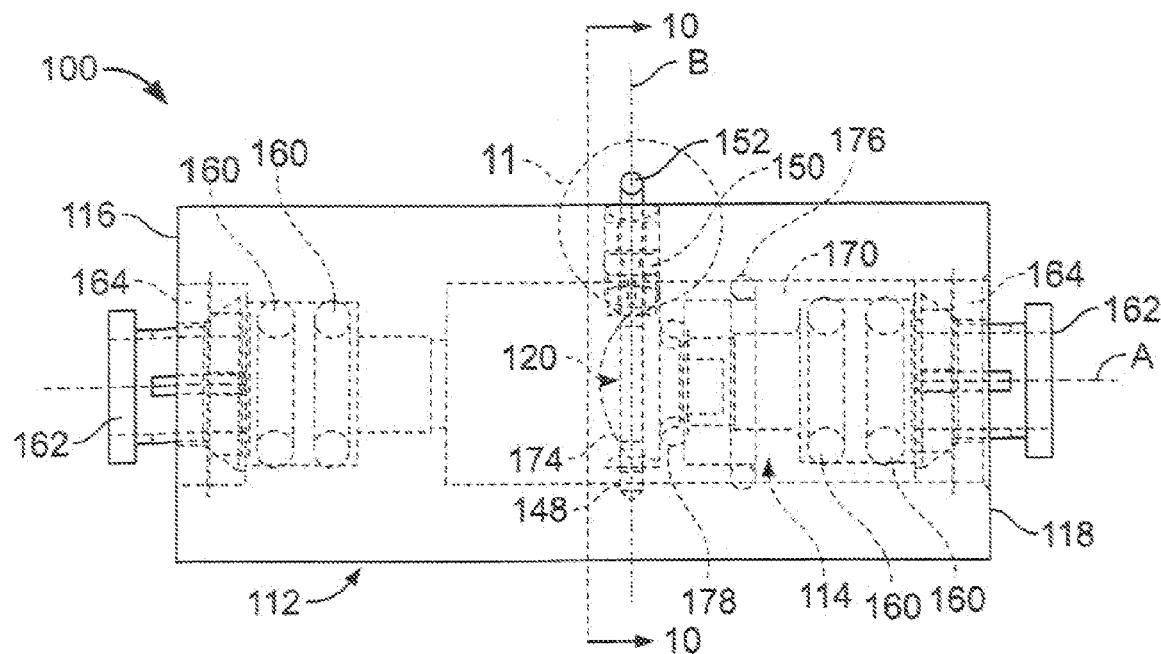
FIG. 9 a top plan view of the valve assembly of FIG. 7.
Figure 10:
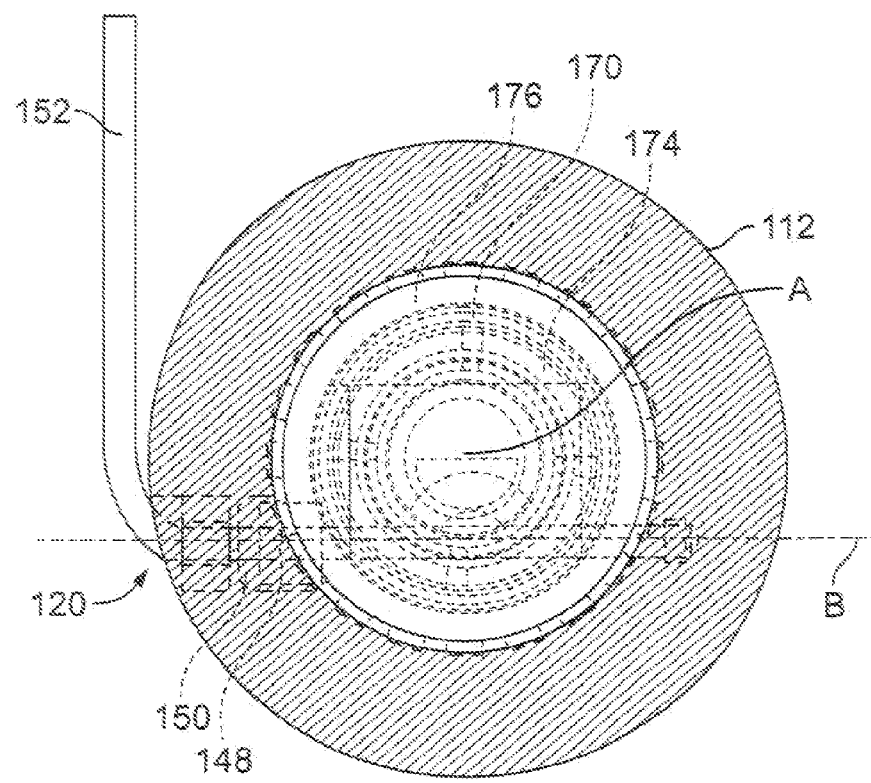
FIG. 10 a sectional view of the valve assembly taken along line 10-10 of FIG. 9.
Figure 11:
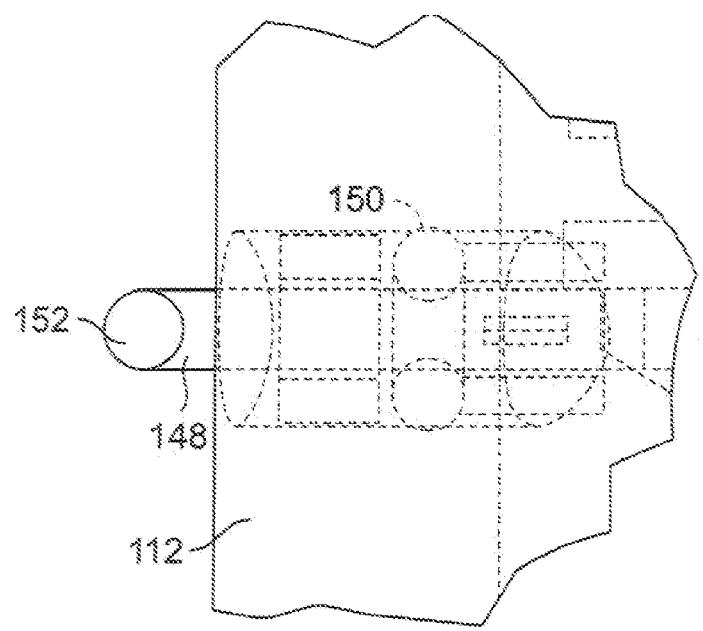
FIG. 11 an enlarged view of a portion of the valve assembly contained in circle 11 of FIG. 9.
Figure 12:
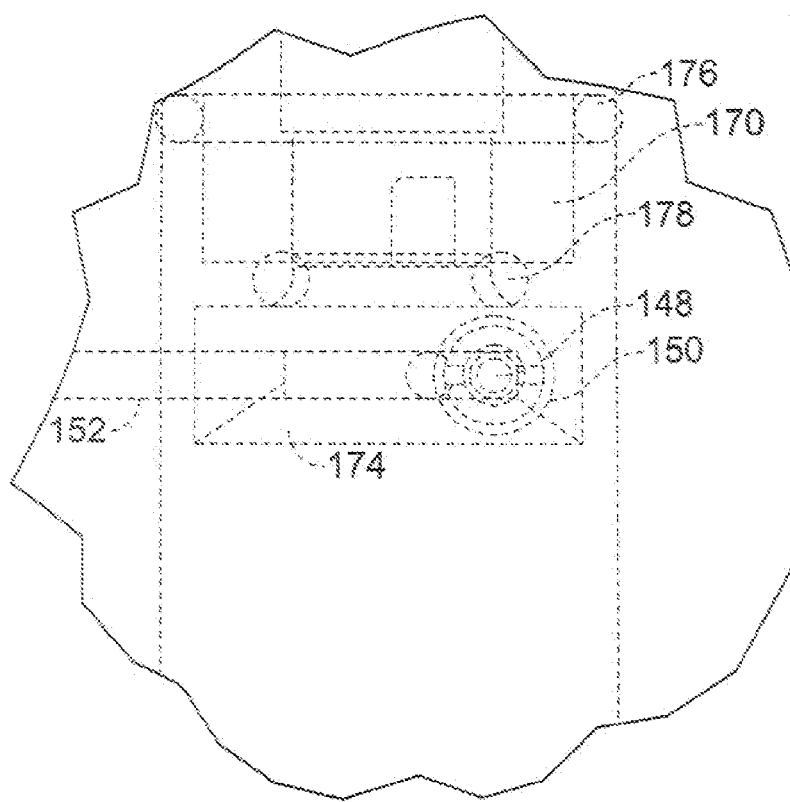
FIG. 12 an enlarged view of a portion of the valve assembly contained in circle 12 of FIG. 8.
Figure 13:
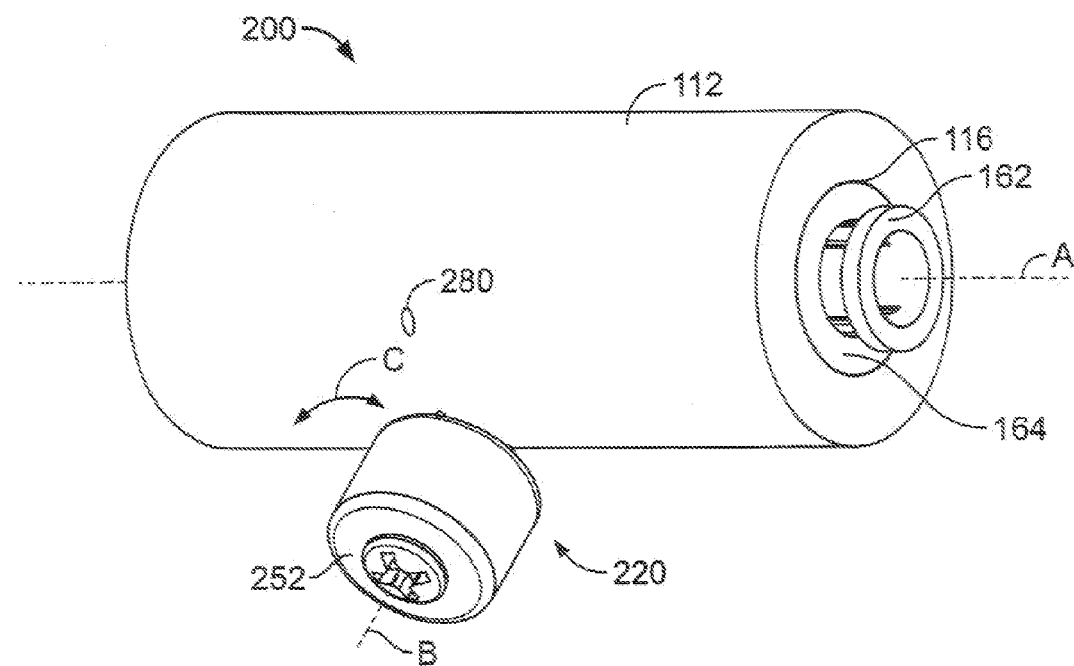
FIG. 13 is a perspective view of an additional exemplary embodiment of a safety valve assembly constructed in accordance with the present disclosure.
Figure 14:
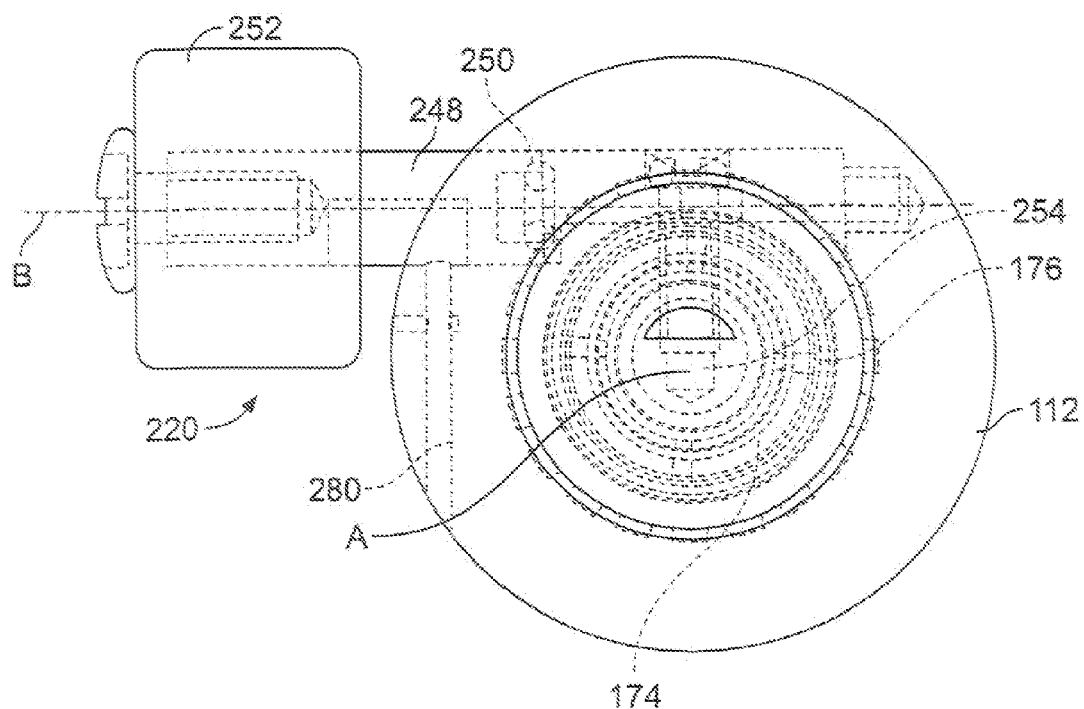
FIG. 14 is an end elevation view of the valve assembly of FIG. 13.
Figure 15:
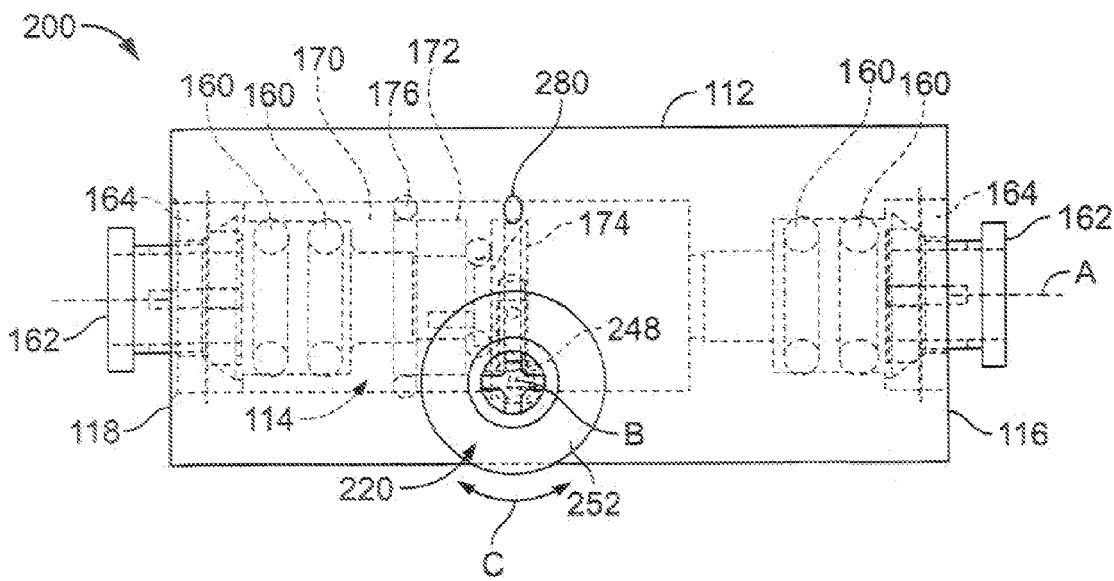
FIG. 15 a side elevation view of the valve assembly of FIG. 13.
Figure 16:
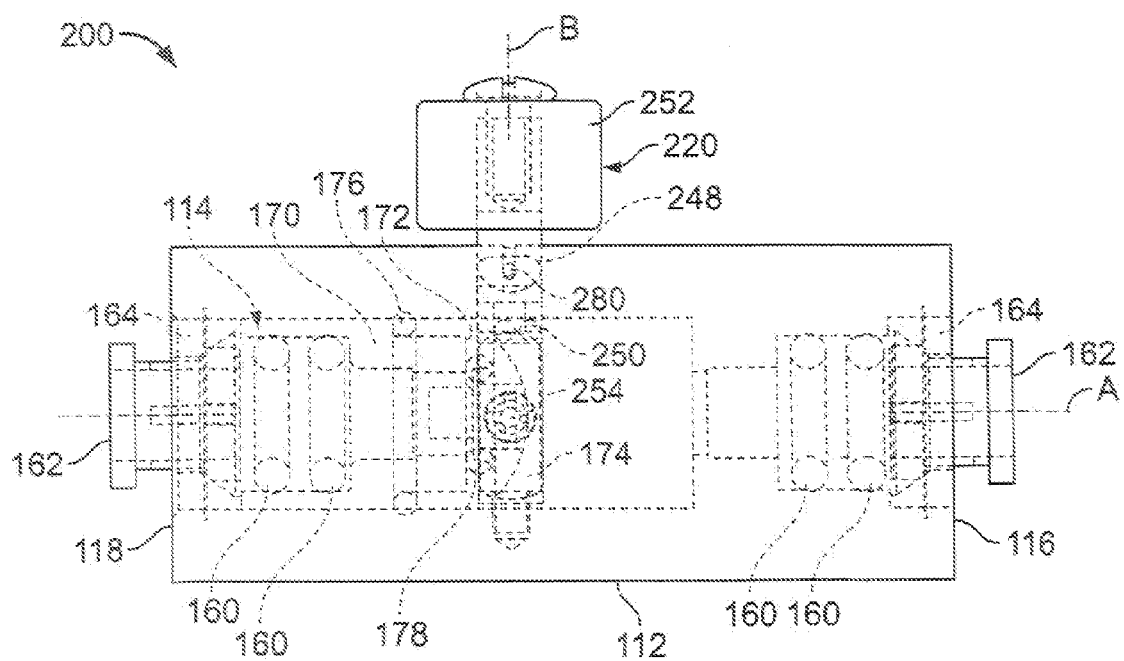
FIG. 16 a top plan view of the valve assembly of FIG. 13.
Figure 17:
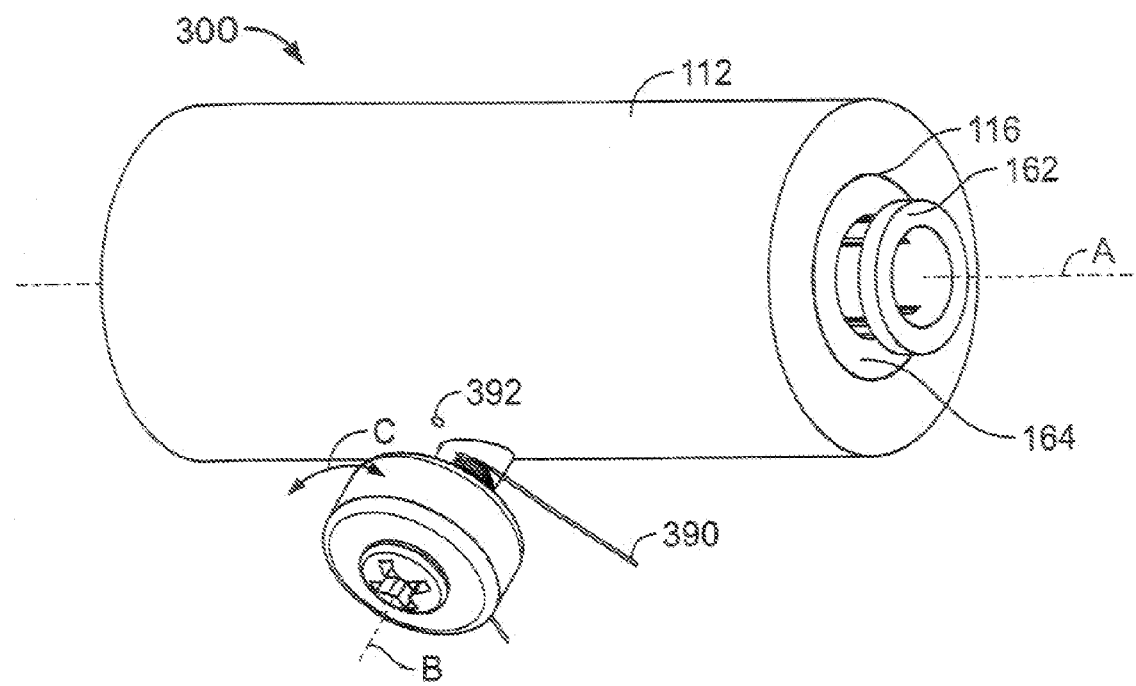
FIG. 17 is a perspective view of a further exemplary embodiment of a safety valve assembly constructed in accordance with the present disclosure.
Figure 18:
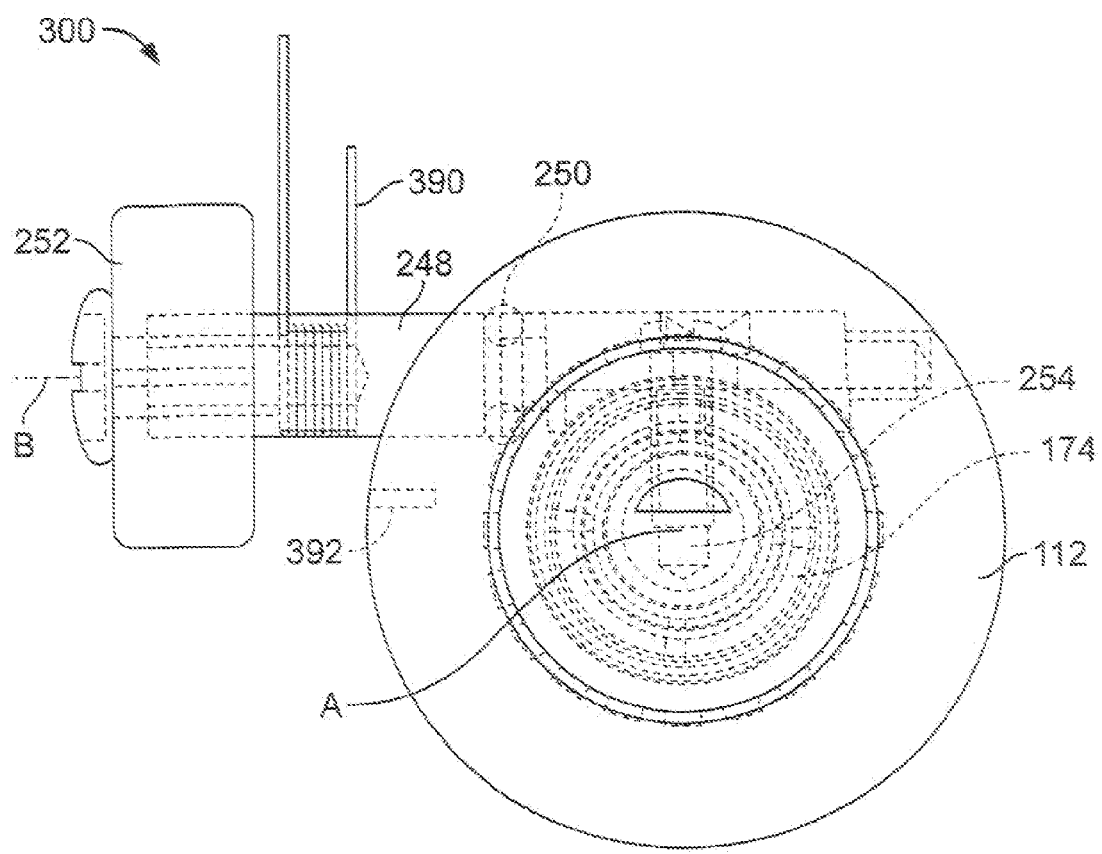
FIG. 18 is an end elevation view of the valve assembly of FIG. 17.
Figure 19:
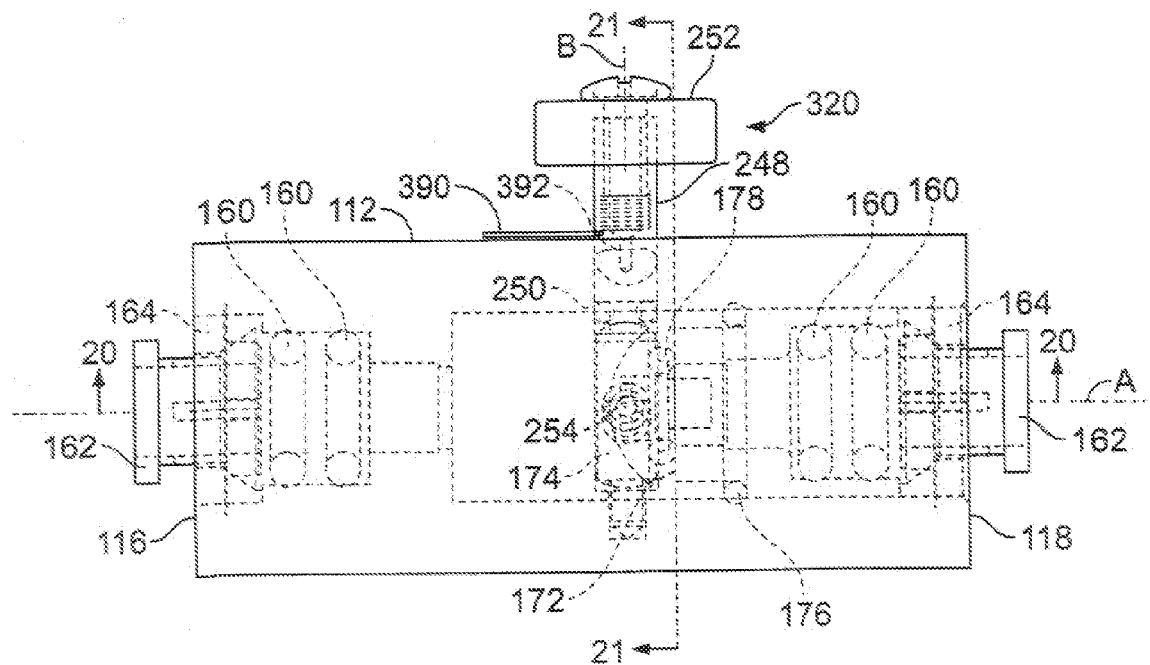
FIG. 19 a top plan view of the valve assembly of FIG. 17.
Figure 20:
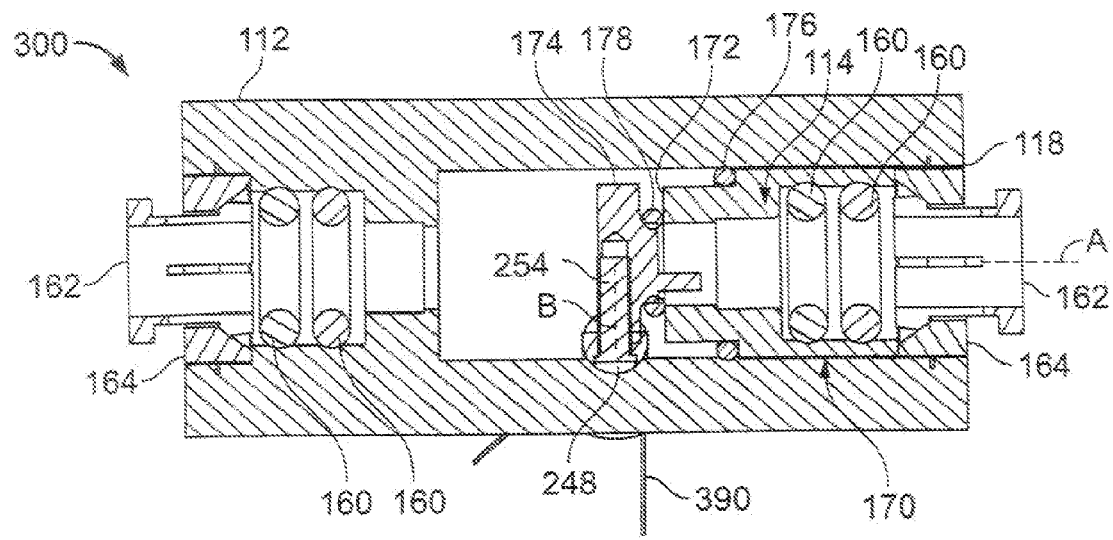
FIG. 20 a sectional view of the valve assembly taken along line 20-20 of FIG. 19.
Figure 21:
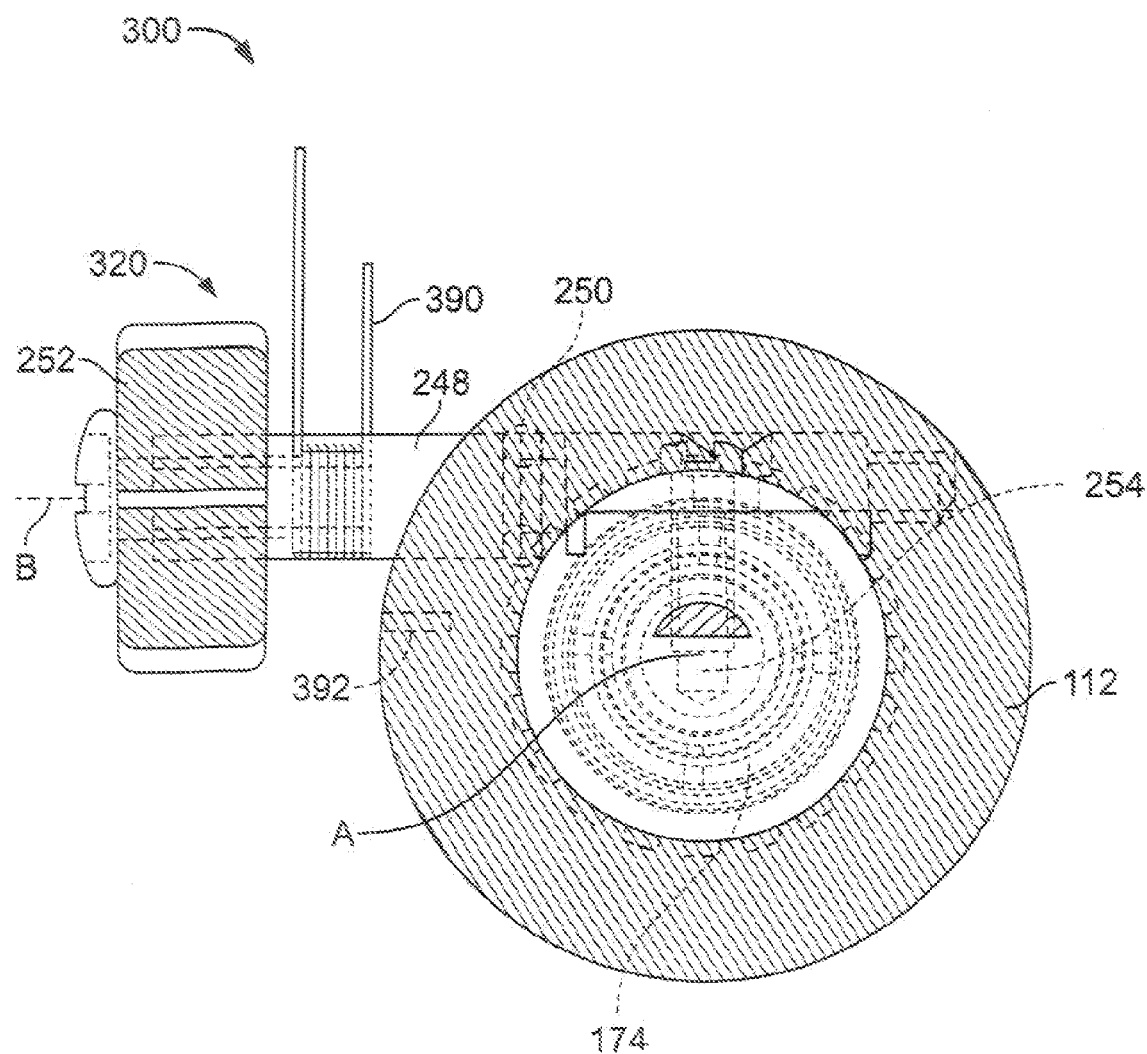
FIG. 21 a sectional view of the valve assembly taken along line 21-21 of FIG. 19.

The excess flow shut-off mechanism 14 includes a spring 32, a diaphragm 36, and a valve flapper comprising a piston 34 and a guide 38. The spring 32 biases the piston 34 away from the valve seat 26 provided at the outlet 18 of the valve housing 12. The diaphragm 36 has an outer circumference secured between the exit housing 22 and the inlet housing 24, and a central opening that receives the piston 34, and is received by the guide 38 in a fluid tight manner. FIG. 6 also shows the diaphragm 36, the piston 34, and the guide 38. The diaphragm 36, the piston 34, and the guide 38 are secured together for unitary movement.

As also shown in FIG. 6, the guide 38 includes a cup 40 that receives the diaphragm 36 and has passageways 42 that allow fluid flow from the inlet 16 through the diaphragm 36 and the piston 34. The guide 38 also includes a shaft 44 that extends from the cup 40 and through the grate 30 of the inlet 16, and a stop 46 positioned on the shaft 44 for limiting movement out of the inlet 16 when the excess flow shut-off mechanism 14 is fully opened either by the force of the spring 32 or by the reset mechanism 20. A shoulder of the cup 40 receives the diaphragm 36 while a distal end of the cup 40 extends through the diaphragm 36 and the piston 34. The distal end 40 abuts the valve seat 26 when the excess flow shut-off mechanism 14 is fully closed against the force of the spring 32 by excess fluid flow or by the reset mechanism 20.

The diaphragm 36, the piston 34, and the guide 38 are movable along the central longitudinal axis A of the housing 12 the valve assembly 10 towards the valve seat 26 depending on the amount of water flowing through the valve assembly 10. When fully closed, the piston 34 surrounds the valve seat 26 and the distal end of the guide 38 abuts the valve seat 26 to prevent flow to the outlet 18. Once closed, the upstream pressure then holds the valve assembly 10 fully closed until the pressure is relieved or the excess flow shut-off mechanism 14 is forced open manually using the reset mechanism 20.

Referring to FIGS. 1-5, the reset mechanism 20 includes a rod 48 extending into the housing 12 of the valve assembly 10. The rod 48 is adapted to rotate about its central longitudinal axis "B" within the housing 12 and is provided with an o-ring 50 to prevent water leakage from between the rod and the housing. In the exemplary embodiment shown, the rod 48 is arranged such that the longitudinal axis B of the rod extends normal to the central longitudinal axis A of the housing 12 of the valve assembly 10. As shown best in FIG. 2, the rod 48 is offset from, and does not intersect the longitudinal axis A of the valve assembly 10.

The reset mechanism 20 also includes a lever arm 52 that extends from the exposed end of the rod 48. As its name implies, the lever arm 52 is used to rotate the rod 48 about the axis of the rod. Back and forth rotation of the lever arm 52 and the rod 48 is illustrated by arrow C in FIGS. 1 and 2. As shown in FIGS. 2-5, a hook 54 extends from the rod 48 and is received around the shaft 44 of the excess flow shut-off mechanism 14. The hook 54 and the rod 48 are also shown in FIG. 6. The hook 54 connects the manually-operated reset mechanism 20 to the excess flow shut-off mechanism 14 so that moving the lever arm 52 toward the outlet 18 sets, or closes, the excess flow shut-off mechanism 14 while moving the lever arm 52 towards the inlet 16 resets, or opens, the excess flow shut-off mechanism 14.

FIGS. 7-21 show additional exemplary embodiments of safety valve assemblies 100, 200, 300 constructed in accordance with the present disclosure. The three embodiments are similar such that similar elements have the same reference numerals. Each valve assembly 100, 200, 300 generally includes an excess flow shut-off mechanism 114 for controlling flow between an inlet 116 and an outlet 118 of a housing 112 of the assembly. The excess flow shut-off mechanism 114 is adapted to automatically stop fluid flow through the valve assemblies 100, 200, 300 when the flow exceeds a specified flow rate. The valve assemblies 100, 200, 300 also include reset mechanisms 120, 220, 320, respectively, for setting and resetting the excess flow shut-off mechanism 114 independently of flow rate.

In the exemplary embodiments shown, each valve assembly 100, 200, 300 is provided with o-rings 160 and collets 162 in the inlets 116 and the outlets 118, which can be used with quick-connect fittings (not shown) and are secured with annular retainers 164. The excess flow shut-off mechanisms 114 each include a tubular body 170 having a valve seat 172 that can be sealed with a flapper 174. The excess flow shut-off mechanisms 114 also each include an o-ring 176 between the tubular body 170 and the housing 112 and an o-ring 178 for creating a fluid-tight seal between the valve seat 172 and the flapper 174 when the flapper is closed. Although not shown, the excess flow shut-off mechanisms 114 may also include a spring to normally hold the flapper 174 away from the valve seat 172 until the flow rate through the valve assembly rises to a predetermined level (e.g., upon a connecting hose rupturing). Alternatively, the biasing spring may be provided in the reset mechanisms 120, 220, 320.

Referring to FIGS. 7-12, the reset mechanism 120 of the valve assembly 100 includes a rod 148 extending into the housing 112. The rod 148 is adapted to rotate about its central longitudinal axis B within the housing 112 and is provided with an o-ring 150 to prevent water leakage from between the rod and the housing. In the exemplary embodiments shown, the rod 148 is arranged such that the longitudinal axis B of the rod extends normal to the central longitudinal axis A of the valve assembly 100. The rod 148 is offset from, and does not intersect the longitudinal axis A of the valve assembly 100.

The reset mechanism 120 of FIGS. 7-12 also includes a lever arm 152 that extends from the exposed end of the rod 148. In the exemplary embodiment shown, the lever arm 152 is unitarily formed with the rod 148. The rod 148 extends through the valve flapper 174 of the excess flow shut-off mechanism 114 so that moving the lever arm 152 towards the outlet 118 sets, or closes, the excess flow shut-off mechanism 114 while moving the lever arm 152 towards the inlet 116 resets, or opens, the excess flow shut-off mechanism 114. Movement of the lever arm 152 is illustrated by arrow C in FIGS. 7 and 8.

Referring to FIGS. 13-16, the reset mechanism 220 of the valve assembly 200 includes a rod 248 extending into the housing 112. The rod 248 is adapted to rotate about its central longitudinal axis B within the housing 112 and is provided with an o-ring 250 to prevent water leakage from between the rod and the housing. The reset mechanism 220 also includes a knob 252 secured to the exposed end of the rod 248. A connecting arm 254 extends from rod 248 and into the valve flapper 174 of the excess flow shut-off mechanism 114 so that turning the knob 252 towards the outlet 118 sets, or closes, the excess flow shut-off mechanism 114 while turning the knob 252 towards the inlet 116 resets, or opens, the excess flow shut-off mechanism 114. The housing 112 of the valve assembly also includes a passageway 280 extending normal to the rod 248 that can receive a bar (not shown) to lock the rod 248 and the excess flow shut-off mechanism 114 in an open or a closed position.

The valve assembly 300 of FIGS. 17-21 is similar to the valve assembly 200 of FIGS. 13-16, but further includes a spring 390 for biasing the rod 248 and the excess flow shut-off mechanism 114 into an open position until the flow through the valve assembly 300 becomes excessive. In the exemplary embodiment shown, the spring comprises a torsion spring 390 received on the rod 248 between the housing 112 and the knob 252. A bore 392 is provided in the housing 112 of the assembly 300 for securing one or both ends of the spring 390.

Thus, the present disclosure provides new and improved safety valves providing manual operation. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims. For example, a small electrical motor can be operatively connected to the reset mechanism, in place of the lever arm or knob, for operating the mechanism upon the application of electricity. Accordingly, other embodiments are within the scope of the following claims. In addition, the safety valves disclosed herein, and all elements thereof, are contained within the scope of at least one of the following claims. No elements of the presently disclosed safety valves are meant to be disclaimed.

What is claimed is:

1. A valve assembly comprising:
    a housing having a central longitudinal axis extending between an inlet and an outlet;
    an excess flow shut-off mechanism contained within the housing for preventing excess flow between the inlet and the outlet of the housing; and
    a reset mechanism for setting and resetting the excess flow shut-off mechanism, wherein the reset mechanism includes,
        a rod extending into the housing for rotation about a central longitudinal axis, wherein the rod is arranged such that the central longitudinal axis of the rod extends normal to the central longitudinal axis of the housing and wherein the rod is operatively connected to the excess flow shut-off mechanism such that rotation of the rod causes the excess flow shut-off mechanism to be one of set and reset, and
        a hook operatively connecting the rod to a movable valve flapper of the excess flow shut-off mechanism.

2. The valve assembly of claim 1, wherein the rod is offset from, and does not intersect the longitudinal axis of the housing of the valve assembly.

3. The valve assembly of claim 1, wherein the reset mechanism further comprises a lever arm connected to an exposed end of the rod.

4. The valve assembly of claim 1, wherein the excess flow shut-off mechanism comprises a fixed valve seat, and the movable valve flapper contacts the valve seat when the shut-off mechanism is set and is spaced from the valve seat when the shut-off mechanism is reset.

5. The valve assembly of claim 4, wherein the excess flow shut-off mechanism further comprises a spring biasing the valve member away from the valve seat.

6. The valve assembly of claim 1, wherein the reset mechanism further comprises a knob connected to an exposed end of the rod.

7. The valve assembly of claim 1, wherein the reset mechanism further comprises a spring biasing the rod against rotation.

8. A valve assembly comprising:
    a housing having a central longitudinal axis extending between an inlet and an outlet;
    an excess flow shut-off mechanism contained within the housing for preventing excess flow between the inlet and the outlet of the housing, wherein the excess flow shut-off mechanism includes,
        a diaphragm having an outer circumference secured in the housing in a fluid-tight manner and an inner circumference defining a central opening,
        a guide extending through central opening of the diaphragm,
        a piston secured over the guide such that the inner circumference of the diaphragm is sandwiched between the guide and the piston in a fluid-tight manner, wherein the piston, the diaphragm, and the guide are movable together along the central axis of the housing towards and away from a valve seat at the outlet of the valve housing, and wherein the guide includes passageways that allow fluid flow from the inlet of the housing, through the central opening of the diaphragm and the piston, to the outlet of the housing, and wherein fluid flow is prevented when the piston and the guide contact the valve seat, and
        a spring biasing the piston, the diaphragm, and the guide away from the valve seat.

9. The valve assembly of claim 8, wherein the guide includes a cup that receives the diaphragm and defines the passageways of the guide, a shaft that extends from the cup and through a grate of the inlet of the housing, and a stop positioned on the shaft for limiting movement out of the inlet when the excess flow shut-off mechanism is fully opened by the force of the spring.

10. The valve assembly of claim 9, further comprising a reset mechanism for setting and resetting the excess flow shut-off mechanism, wherein the reset mechanism comprises:

a rod extending into the housing for rotation about a central longitudinal axis and operatively connected to the excess flow shut-off mechanism through a hook received on the shaft of the guide of the shut-off mechanism between the cup and the stop of the guide, such that rotation of the rod causes the piston, the diaphragm, and the guide to move along the central axis of the housing towards and away from the valve seat at the outlet of the valve housing.

11. The valve assembly of claim 10, wherein the rod is arranged such that the central longitudinal axis of the rod extends normal to the central longitudinal axis of the housing.

12. The valve assembly of claim 11, wherein the rod is offset from, and does not intersect the longitudinal axis of the housing of the valve assembly.

13. The valve assembly of claim 12, wherein the reset mechanism further comprises a lever arm connected to an exposed end of the rod.

* * * * *